(12) United States Patent
Green

(10) Patent No.: US 10,764,723 B1
(45) Date of Patent: Sep. 1, 2020

(54) DIGITAL AUDIO AND VIDEO DATA, AND INFORMATION DISTRIBUTION SYSTEM FOR CELLULAR SMARTPHONES

(71) Applicant: Lounzy A Green, Mcdonough, GA (US)

(72) Inventor: Lounzy A Green, Mcdonough, GA (US)

( * ) Notice: Subject to any disclaimer, the term of this patent is extended or adjusted under 35 U.S.C. 154(b) by 0 days.

(21) Appl. No.: 16/663,299

(22) Filed: Oct. 24, 2019

(51) Int. Cl.
| | |
|---|---|
| *H04W 4/06* | (2009.01) |
| *H04W 4/90* | (2018.01) |
| *G06F 16/41* | (2019.01) |
| *G06F 21/62* | (2013.01) |
| *H04W 12/08* | (2009.01) |
| *H04W 84/04* | (2009.01) |

(52) U.S. Cl.
CPC .............. *H04W 4/06* (2013.01); *G06F 16/41* (2019.01); *G06F 21/6218* (2013.01); *H04W 4/90* (2018.02); *H04W 12/08* (2013.01); *H04W 84/042* (2013.01)

(58) Field of Classification Search
CPC .................................. H04W 4/06; H04W 4/90
See application file for complete search history.

(56) References Cited

U.S. PATENT DOCUMENTS

2015/0012123 A1* 1/2015 Irmler ................... G06F 16/489
700/94

* cited by examiner

*Primary Examiner* — Keith Ferguson
(74) *Attorney, Agent, or Firm* — John C. Smith

(57) ABSTRACT

A system that stores digital audio and/or video information, and further communicates with emergency alert systems to transfer data to a remote device, such as a smartphone. The application has corresponding software applications on the sending and receiving systems that execute a handshake procedure to ensure that the data transfer is authorized. The sending system uploads the digital audio and/or video information to the remote device prior to activating audio data output by the receiving device. This system also provides for uploading informational messages, such as emergency broadcast, etc., that are used to ensure that the maximum number of individuals are alerted to the emergency information.

5 Claims, 4 Drawing Sheets

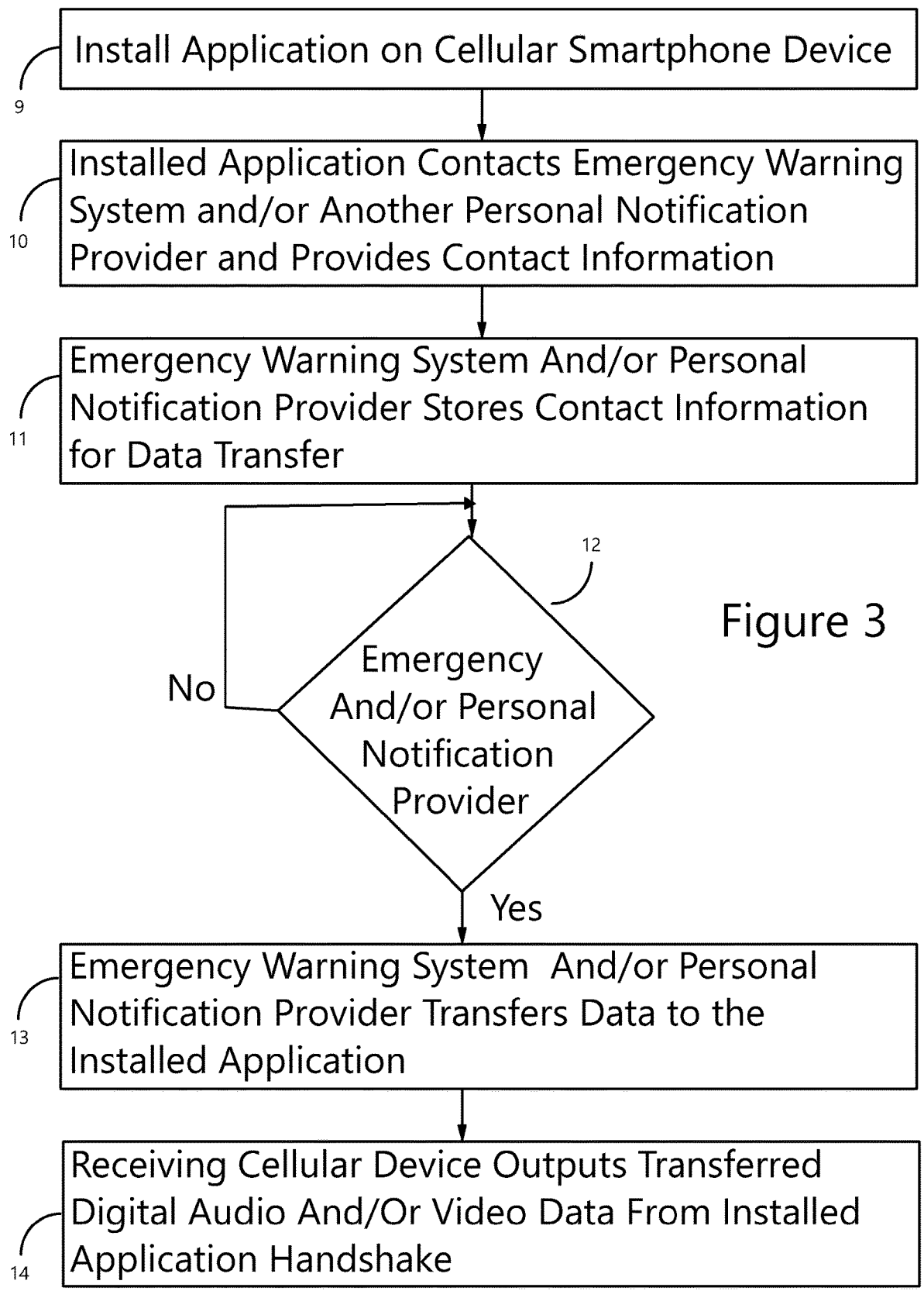

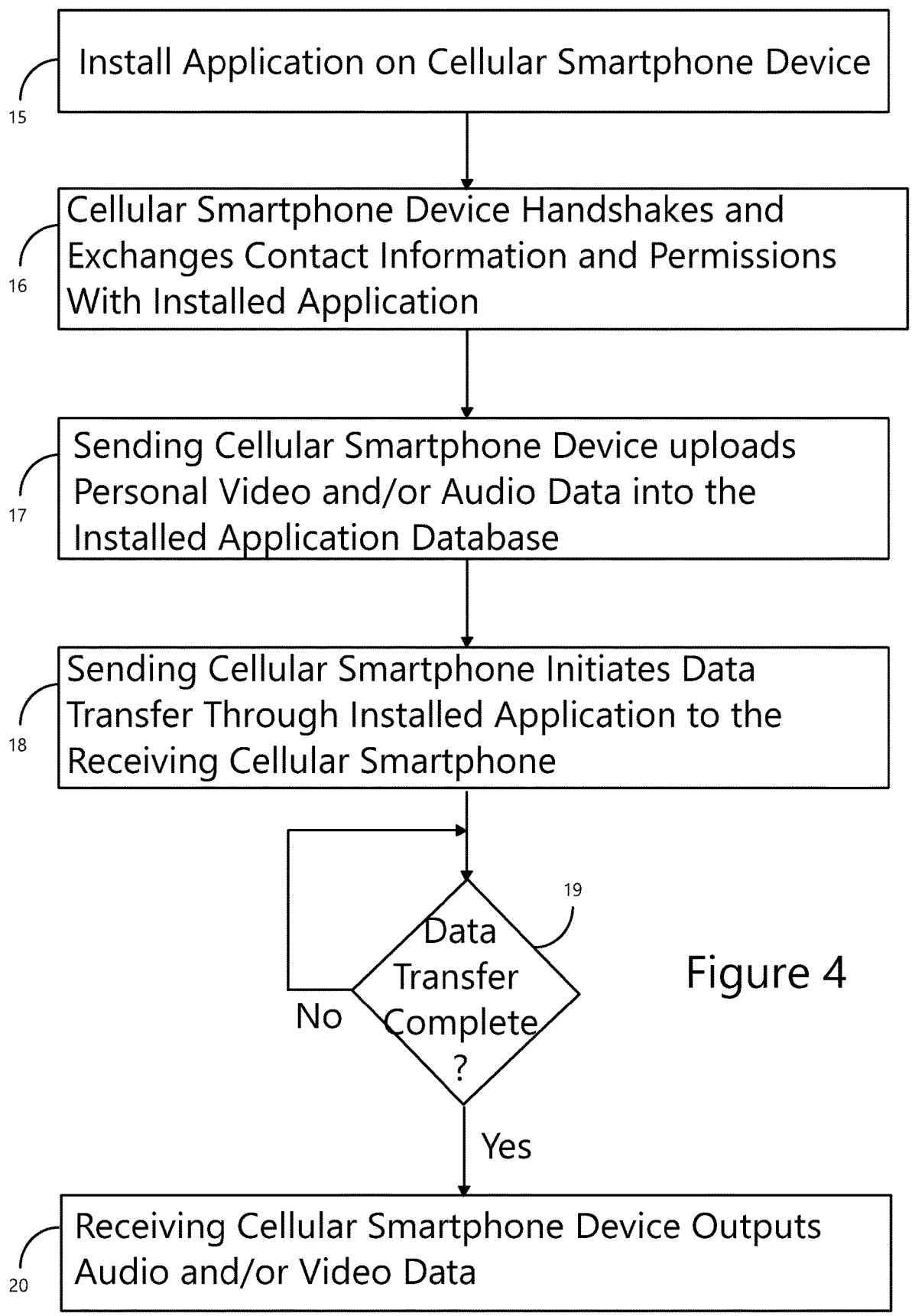

DIGITAL AUDIO AND VIDEO DATA, AND INFORMATION DISTRIBUTION SYSTEM FOR CELLULAR SMARTPHONES

BACKGROUND OF THE INVENTION

Technical Field

The invention is related to cellular telephone systems. In particular, it relates to a method of remotely accessing an installed application user's cellular smartphone and distributing digital audio ring tones, digital video, music, and/or emergency alerts as well as informational messages on a temporary or timed basis.

Background

Today, cellular telephone systems allow users to change their digital audio ring tones in a variety of ways, such as substituting musical works, different sounds, voice messages, etc. However, altering the digital audio ring tone and digital video output is currently done only by the user from that user's cellular telephone. The user has to download and install a selected digital audio ring tone, digital video, and/or install one of several preloaded digital audio ring tones or digital videos to the device. This is done for entertainment or amusement purposes. Prior art cellular smartphones do not currently provide for remote alteration of digital audio ring tones or digital video. It would be desirable to have a method of remotely temporarily changing connected user's digital audio ring tones, digital video on a cellular smartphone for specific events, entertainment, novelty and informational purposes.

In addition to digital audio ring tones and digital videos, many cellular smartphone users have digital audio or video installed through downloading and storing on their cellular smartphones that can be used for a variety of entertainment or amusement purposes. As was the case with the digital audio ring tones and digital videos, individuals who want to upload music on a remote cellular telephones for amusement or commemorative purposes, cannot do so because current cellular smartphones do not have the ability to install music from a remote location without having the cellular telephone's owner actively involved in the music transfer.

A third and important failing of the prior art is that it has limited ability to distribute informational messages that may be important in an emergency situation. For example, when there is an amber alert for missing child, or a weather alert for an impending storm or tornado, etc., the prior art warning systems typically send these messages out as text messages. Many automobile drivers would ignore the notification in the form of a text message while driving for safety reasons. It would be desirable to have a method of transmitting audio messages that are automatically played on the receiving cellular smartphone without any action on the part of the driver. In that manner, the driver would be able to receive the message without being distracted from paying attention to the road.

While the prior art has provided a minimum level of locally controlled cellular smartphone audio and video features, it has failed to provide a dynamic method of remotely controlling audio or video features such that audio and video messages of several types can be automatically output to a cellular smartphone user without any action required on the part of the receiving user.

SUMMARY OF THE INVENTION

The present invention provides a software application that allows digital audio and video information to be uploaded to a remote cellular smartphone. The application has software components on the sending system and on the receiving system. The receiving system incorporates software that recognizes the sending system when contacted and is configured to communicate with, and receive audio or video information from, the sending system.

BRIEF DESCRIPTION OF THE DRAWINGS

FIG. 3 is a flow chart that illustrates the installation and interaction between the sending system and the receiving system where the sending system is one or more emergency warning systems.

FIG. 4 is a flow chart that illustrates the installation and interaction between the sending system and the receiving system where the sending system is an individual authorized sender.

DESCRIPTION OF THE PREFERRED EMBODIMENT

Figure 1:
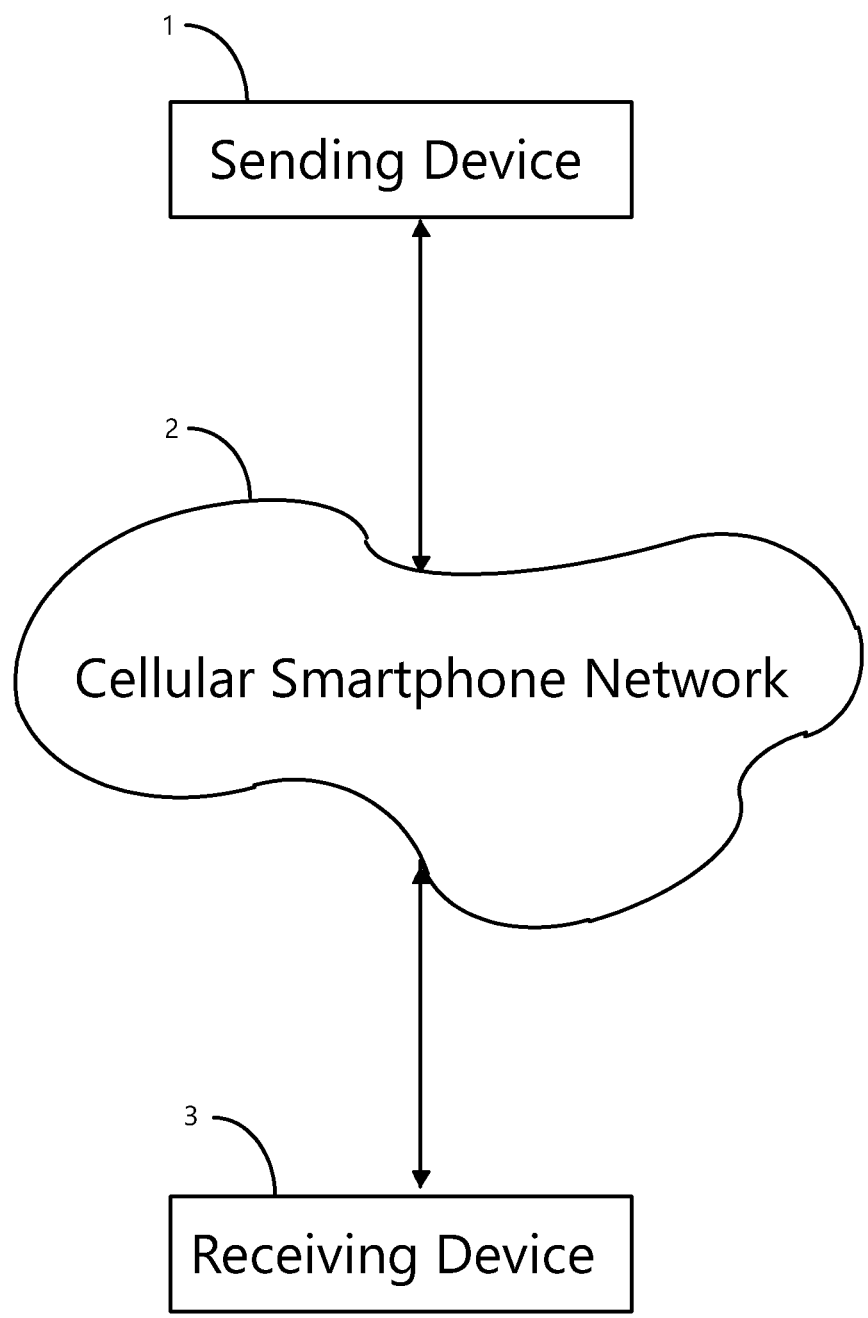
FIG. 1 illustrates the communication link between the sending system and the receiving system.

Prior to a detailed discussion of the figures, a general overview of the invention will be presented. The invention provides the sending system the ability to download digital video and/or audio, and then upload the digital audio to play as ring tone, and/or video to play audio messages on the receiving system. This capability is enabled when both users have downloaded the application and have agreed to the terms and condition of the application by providing the appropriate information. By requiring the consent of the receiving device, the application avoids a situation where unwanted information is input to the receiving device.

For ease of discussion, the invention will be discussed in terms of a cellular smartphone. However, those skilled in the art will recognize that a variety of electronic devices currently have cellular smartphone functionality, such as tablet computers, notebook computers, iPads™, etc. For example, cellular smartphones and personal computers have software such as Skype™ and/or Facetime™ which allows video calls between smartphones, PCs, laptops, etc. For ease of discussion, the term cellular smartphone will be used to describe any of these devices in this disclosure.

The application also provides a database that contains a variety of digital audio and video information, such as conventional digital audio and videos in the form of music, film, animal sounds and other sound effects (both, entire works or small snippets), verbal messages, and/or informational messages. The digital audio and video database contain entries from a variety of digital video and audio genres that includes music, film, animal sounds and sound effects. The verbal messages are useful as personalized messages from one individual to another, or as informational messages. In addition, the system also allows the sending system to upload customized messages, which may be verbal messages, recorded digital audio and/or, video data that are not in the library.

An additional significant advantage of the invention is that it can be used by emergency warning systems to distribute important emergency information such as information related to weather, information related to individuals, such as Amber alerts, and other information intended for wide distribution to the public. For ease of discussion, the term emergency warning system only is there and to distinguish from other sending systems. An addition, there may be more than one emergency sending system. For example, a police system may act as an emergency sending system when they broadcast information about an Amber alert or a Silver alert. Likewise, other designated systems, such as weather related and web sites, may also act as emergency sending systems to alert the public about dangerous weather conditions, such as such tornadoes, etc. As a result, multiple emergency sending systems associated with different agencies may interact with a particular receiving device. In this scenario, the receiving system will have information about one or more systems that transmit emergency information that will allow them to execute a handshake procedures that will positively identify the sending system.

When used by an emergency warning system, the emergency warning system, the emergency warning system will typically have a broad range of users that are spread across a wide geographic area. As part of the initial installation of the software, the receiving device will upload location information as well as other identifying data that defines the receiving device and its location. When an emergency situation arises, the warning system will determine the area that is effected by the emergency, and distribute a warning message to those receiving devices that are within that area.

For non-emergency usage, the application is installed on both the sending and receiving systems, and handshake information is installed on both systems so that the receiving system can verify that the contact is being made by an authorized sending system during the installation process, the receiving system formally consents to access to their system by the associated remote system. In this manner, unauthorized access to the receiving device is prevented by the requirement that consent be given by the receiving device. Typically, when the invention is used by individuals, consent is given by both parties since either party may act as the sending system or the receiving device.

When the sending system contacts the receiving cellular smartphone, the two devices execute an initial handshake procedure to identify one another and confirm that the data transfer is authorized. Once the handshake procedure is satisfactorily completed, the data transfer is commenced, and the audio or video data is transferred to the receiving cellular smartphone.

After the audio or video data is received, the nature of the data is specified. For example, the handshake procedure may specify that the data is a digital audio ring tone or digital video message for the receiving cellular smartphone, a voice message, a musical work, video data, etc. In addition, the initial handshake procedure can also include instructions that the particular ring tone is only to be used in conjunction with a call received from a particular caller, or only to be played at a specific time or date (e.g., a birthday, wedding, etc.).

While the primary focus of the invention is directed to enabling hands-free reception of digital audio or video data for situations such as when driving a vehicle, working out, walking, etc. More so, there are other situations where the invention can be used as situations other than through cellular smartphone communication. For example, there are occasions when the invention may be used for computer to computer communications.

In addition, the invention also provides for uploading a digital audio and/or video to a receiving cellular smartphone that may optionally include use instructions for playing a particular musical work at a particular time or date. Typically, the use instructions would be transferred during the handshake procedure. For example, the digital audio and/or video work may be a work related to a special event, such as a birthday or anniversary. For such an event, it is important that the work be played on a specific date for best effect. In a preferred embodiment of the invention, when the digital audio and/or video data is transferred, data describing the timing of the message is also transferred so that the message is delivered at just the right time.

In a preferred embodiment, the invention also provides for distribution of audio messages. The audio messages may relate to a variety of subject matter, such as emergency alerts related to weather, missing persons, breaking news, etc. In addition, the application can also be initialized to provide ongoing audio alerts such as sports alerts (e.g., scores, names of winners, winning teams, etc.), election results, breaking news, etc. In the case of sporting events, or elections, users may be notified as events occur, such as scoring a sporting event, or election results.

In a preferred embodiment, the invention allows the sending system to dynamically change the digital audio and/or video message when making an individual call. For example, the sending system may have a menu of the digital audio and/or video messages that relate to particular events, such as birthdays, anniversaries, or for scheduling events such as timings for concerts, sporting events etc. As a result, the sender can dynamically change the digital audio and/or video to suit a particular occasion. In addition the sending system can dynamically update information such as traffic conditions, to alert drivers of potential problems in the road ahead.

The ability to dynamically change digital audio and/or video output on a receiving application user's cellular smartphone and/or dynamically provide informational messages provides two significant benefits. The first benefit is the amusement factor, whereby the sender can surprise the person receiving the call with a digital audio ring tone or digital video message that may be amusing or affectionate. The second benefit relates to the provision of audio or video messages that are informational in nature. As an example, when an Amber or Silver alert is issued, a driver receiving a call on their cellular smartphone would automatically hear the message when the cellular smartphone rings, thereby removing the distraction that the driver would have when trying to answer a normal text message such as those used for Amber or Silver alerts. In addition, since the driver would receive the message automatically without any effort on the driver's part, it would also avoid the situation where a driver may ignore a text message due to safety concerns.

The invention also allows the sending system to prerecord a message in the form or a digital audio or video message by a selected user or users. This can provide entertainment value in the form of birthday greetings, anniversary congratulations, messages and so on.

Having discussed the features and advantages of the invention in general, we turn now to a more detailed discussion of the figures.

FIG. 1 is a block diagram that illustrates the communications link 2 between the sending system 1 and the receiving device 3. In this example, the communications link 2 is a conventional cellular smartphone system currently in commercial use. The advantage of this approach is that the conventional cellular smartphone system is already available and requires no additional infrastructure to implement the invention. Likewise, the communications link can alternatively be a standard type of internet connection, such as cable, WIFI, etc. These alternative systems can also implement the invention with no additional infrastructure.

Figure 2:
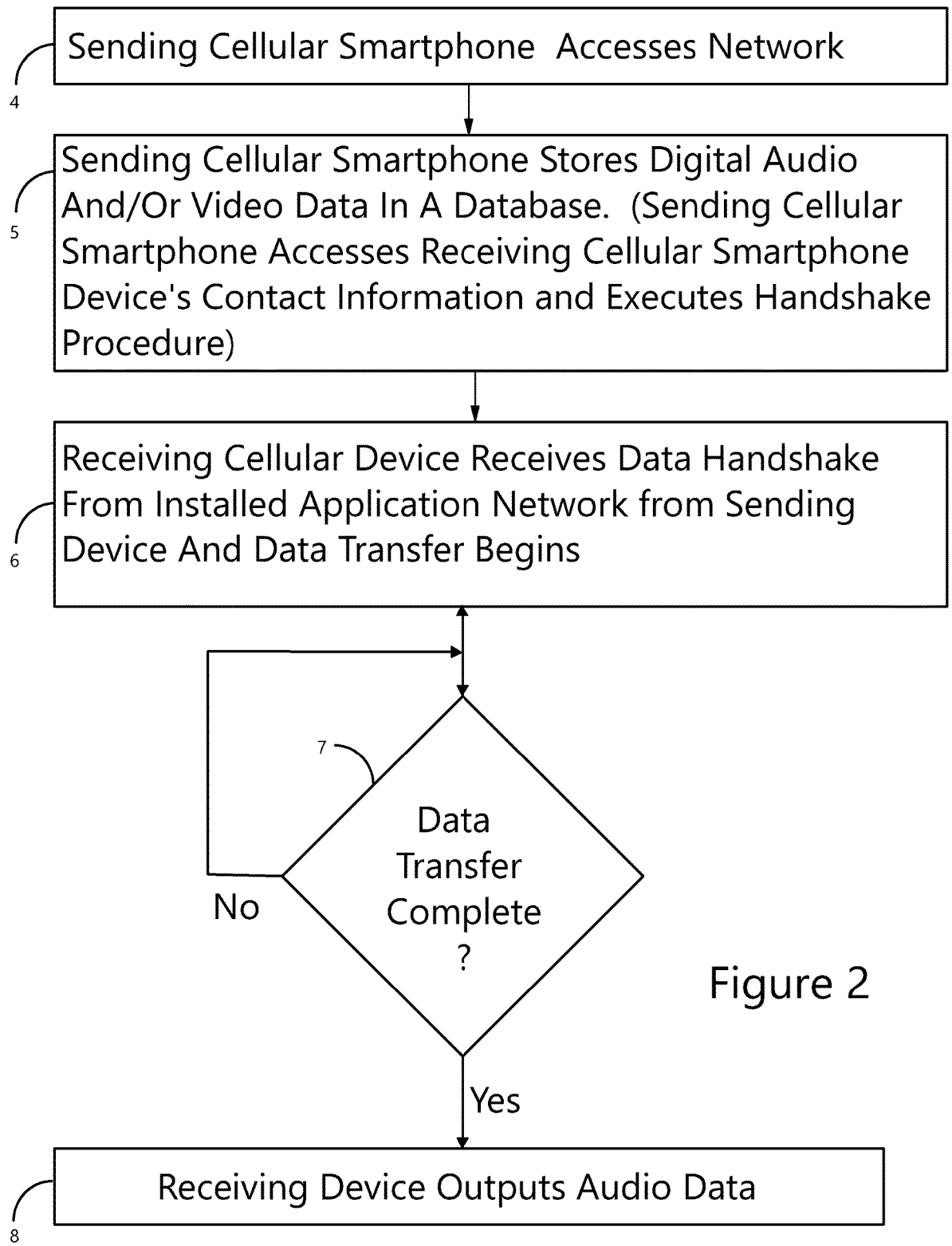
FIG. 2 is a flow chart that illustrates the connection and data transfer between the sending system and the receiving system.

FIG. 2 is a flow chart that illustrates the connection and data transfer between the sending system and the receiving device. At step 4, the sending system stores audio data and/or video data into its database. After the desired audio and/or video data is stored in the database, the sending system then initiates contact with the receiving device at step 5. After contact is established, the sending system initiates a handshake procedure at step 6 so that both the sending system and the receiving device confirm that it is a valid connection. Once confirmation is complete, the sending system begins data transfer to the receiving device. Once data transfer to the receiving device is complete at step 7, the receiving device then outputs the audio and/or video data at step 8.

FIG. 3 is a flow chart that illustrates the installation and interaction between the sending system and the receiving system where the sending system is one or more emergency warning systems.

As shown in this figure, the application is installed on the receiving device at step 9.

In step 10, the installation documentation preferably includes the Internet address of a web site that contains a list of emergency warning systems that can be associated with a particular receiving device. Preferably, the web site can be searched using publicly available location data, such as zip codes or other appropriate public data. This provides the receiving device with the web addresses of each emergency warning system that is appropriate for its particular geographic area. At step 11, the emergency warning system stores the contact information obtained from the receiving device in a database that contains data related to all potential receiving devices, including its location data.

At step 12, the emergency warning system waits until it is instructed to issue an emergency warning to receiving devices within the appropriate geographic area. When the emergency warning system determines that an emergency alert should be issued, it transfers the appropriate data to the receiving device at step 13. At step 14, the receiving device outputs the data.

FIG. 4 is a flow chart that illustrates the installation and interaction between the sending system and the receiving system where the sending system is an individual authorized sender.

At step 15, the application is installed on both the sending system and the receiving device. Those skilled to in the art will recognize that, in the case of individual users, either system can act as the sending system or the receiving device. At step 16, after both systems have the application software installed, the sending system and receiving device perform an initial handshake procedure and exchange contact information and permissions to communicate with one another. At step 17, the sending system and the receiving device each store the contact information for one another. At this point, both the sending system and the receiving device can now initiate contact with one another and deliver messages. As noted above, either system can act as the sending system or the receiving device.

At step 18, the sending system initiates transfer of data to the receiving device. Once the data transfer is complete at step 19, the receiving device outputs the data at step 20.

In the preferred embodiment, the data transfer from the sending system not only includes the digital audio and/or video data, but also includes instructions as to the date and time that the audio data should be output. The receiving device receives the date and time information at step 6, and uses it in step 8 to control the audio and/or video data output timing. As long as there is a remaining time delay at step 7, the receiving device will wait. Once the receiving device determines that data transfer is complete, the receiving device proceeds to output the audio data step 8. Time delays are useful for certain types of data, such as birthdays, etc. Of course, emergency information or information that is updated on an ongoing basis, such as sports scores etc. would have a zero time delay and be output immediately when received.

As noted above, the receiving device can be a cellular smartphone, or any other electronic device that uses cellular smartphone communications, such as tablets computers, notebook computers, etc. Further, the invention can be used on a peer-to-peer basis between a single sending and a single receiving device, and in addition, it can also be used and a broadcast mode where the sending device broadcasts to multiple receiving devices when there is a need for contacting as many individuals as possible, (e.g., Amber alerts, etc.).

As can be seen, the invention is useful for entertainment purposes, where personal digital audio and/or video messages are sent from one individual to another. However, it is also very useful for broadcasting important messages to the public at large. In either mode, the invention allows digital audio and/or video messages to be played without requiring any action on the part of the receiving party. As a result, safety is improved for drivers, and the message will also be received by individuals who may not otherwise be inclined to read a text message when it arrives.

The ability of a remote system to unilaterally output data on a remote receiving device without any action on the part of the user of the remote receiving device is especially advantageous because it eliminates the need for vehicle drivers to take their eyes off of the road in order to receive a message. As such, it is a considerable improvement in traffic safety.

While the invention has been described with respect to a preferred embodiment thereof, it will be understood by those skilled in the art that various changes in detail may be made therein without departing from the spirit, scope, and teaching of the invention. For example, the sending or receiving device can take various forms, the digital audio and/or video message information can vary, etc. Accordingly, the invention herein disclosed is to be limited only as specified in the following claims.

I claim:

1. A method of transferring digital audio and/or video data from a sending device to a receiving device and initiating play back on the receiving device without user intervention at the receiving device, including the steps of:

installing communication software on both a receiving device and sending device to control audio and/or video data transfer from a sending device to a receiving device;

storing a plurality of digital audio and/or video data files a database;

the sending device can store digital audio and/or video data files into the database and retrieve digital audio and/or video data files from the database, the sending device further having a data output for outputting data to a cellular smartphone network;

inputting data from the cellular smartphone network into a receiving device having a data input;

the database further having timing instructions associated with each of the audio and/or video files in the database, the timing instructions accompany each audio and/or video file transferred from the sending device; and the receiving device using the timing instructions from the sending device to set a timer for initiating digital audio and/or video output based on the timing instructions associated with a particular digital audio and/or video file;

whereby a sending system can remotely program a receiving device to play a particular digital audio and/or video data file at a specified time.

2. A method, as in claim 1, including the additional step of:

initializing the sending and receiving devices with a handshake procedure that permits each device grants each device permission to communicate with the other device.

3. A method, as in claim 2, including the additional step of: having a plurality of handshake procedures such that a plurality of sending devices can communicate with a receiving device.

4. A method, as in claim 1, including the additional step of:

delaying output of the audio and/or video files on the receiving device until the entire audio and/or video file is downloaded.

5. A method, as in claim 1, wherein:

the communication software on the receiving device further contacts a remote emergency warning system or other personal notification provider and transfers contact information to the remote emergency warning system or other personal notification provider such that the remote emergency warning system or other personal notification provider is able to contact the receiving device when necessary.

* * * * *